(12) United States Patent
Budagavi (10) Patent No.: US 11,197,002 B2
(45) Date of Patent: Dec. 7, 2021

(54) METHOD AND APPARATUS FOR SAMPLE ADAPTIVE OFFSET PARAMETER ESTIMATION FOR IMAGE AND VIDEO CODING

(71) Applicant: Texas Instruments Incorporated, Dallas, TX (US)

(72) Inventor: Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/591,809

(22) Filed: Oct. 3, 2019

(65) Prior Publication Data

US 2020/0107029 A1 Apr. 2, 2020

Related U.S. Application Data

(63) Continuation of application No. 13/530,920, filed on Jun. 22, 2012, now Pat. No. 10,484,693.

(60) Provisional application No. 61/608,386, filed on Mar. 8, 2012, provisional application No. 61/607,069, filed on Mar. 6, 2012, provisional application No. 61/559,922, filed on Nov. 15, 2011, provisional application No. 61/538,289, filed on Sep. 23, 2011, provisional application No. 61/502,399, filed on Jun. 29, 2011, provisional application No. 61/500,280, filed on Jun. 23, 2011, provisional application No. 61/499,863, filed on Jun. 22, 2011.

(51) Int. Cl.
*H04N 19/167* (2014.01)
*H04N 19/14* (2014.01)
*H04N 19/61* (2014.01)
*H04N 19/82* (2014.01)
*H04N 19/176* (2014.01)
*H04N 19/117* (2014.01)

(52) U.S. Cl.
CPC ......... *H04N 19/167* (2014.11); *H04N 19/117* (2014.11); *H04N 19/14* (2014.11); *H04N 19/176* (2014.11); *H04N 19/61* (2014.11); *H04N 19/82* (2014.11)

(58) Field of Classification Search
None
See application file for complete search history.

(56) References Cited

U.S. PATENT DOCUMENTS

| 8,660,174 B2 | 2/2014 | Fu et al. |
| 2011/0274158 A1 | 11/2011 | Fu et al. |
| 2012/0082217 A1* | 4/2012 | Haskell ............... H04N 19/192 375/240.12 |
| 2012/0177103 A1 | 7/2012 | Fu et al. |

(Continued)

*Primary Examiner* — Samuel D Fereja
(74) *Attorney, Agent, or Firm* — Charles F. Koch; Charles A. Brill; Frank D. Cimino (57) ABSTRACT

A method and apparatus for decoding video. The method includes determining a sample adaptive offset edge type of at least a portion of the image, determining a boundary edge type of the at least a portion of the image, modifying the sample adaptive offset edge type of the at least a portion of the image according to the determined edge type of the at least a portion of the image, selecting a sample adaptive offset type according to at least one of the determined sample adaptive offset edge type or the modified sample adaptive offset edge type, and filtering at least a portion of the image utilizing the selected filter type.

3 Claims, 10 Drawing Sheets

(56) References Cited

U.S. PATENT DOCUMENTS

| | | |
|---|---|---|
| 2012/0177107 A1 | 7/2012 | Fu et al. |
| 2012/0207227 A1* | 8/2012 | Tsai ................. H04N 19/70 375/240.29 |
| 2012/0230423 A1 | 9/2012 | Esenlik et al. |
| 2012/0230428 A1 | 9/2012 | Segall et al. |
| 2012/0294353 A1* | 11/2012 | Fu ................. H04N 19/176 375/240.02 |
| 2013/0322523 A1* | 12/2013 | Huang ............. H04N 19/182 375/240.02 |
| 2014/0328413 A1* | 11/2014 | Esenlik ........... H04N 19/197 375/240.29 |
| 2015/0163488 A1 | 6/2015 | Tsai et al. |

* cited by examiner

METHOD AND APPARATUS FOR SAMPLE ADAPTIVE OFFSET PARAMETER ESTIMATION FOR IMAGE AND VIDEO CODING

CROSS-REFERENCE TO RELATED APPLICATIONS

This application is a continuation of U.S. patent application Ser. No. 13/530,920, filed Jun. 22, 2012, which claims priority to U.S. Provisional Application No. 61/499,863, filed on Jun. 22, 2011, U.S. Provisional Application No. 61/500,280, filed on Jun. 23, 2011, U.S. Provisional Application No. 61/502,399, filed Jun. 29, 2011. This application claims priority to U.S. Provisional Application No. 61/607,069, filed Mar. 6, 2012, U.S. Provisional Application No. 61/608,386, filed Mar. 8, 2012 and U.S. Provisional Application No. 61/538,289, filed on Sep. 23, 2011 and U.S. Provisional Application No. 61/559,922, filed on Nov. 15, 2011. All of which are herein incorporated by reference.

FIELD OF THE INVENTION

This invention generally relates to a method and an apparatus for sample adaptive offset parameter estimation for image and video coding.

BACKGROUND OF THE INVENTION

Figure 1:
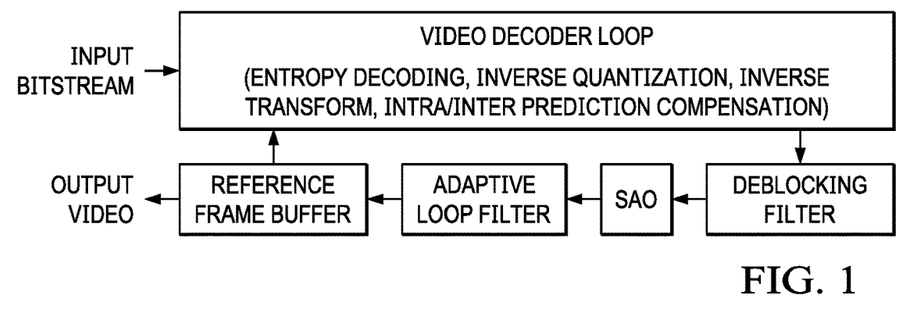
FIG. 1 is an embodiment depicting a decoding Architecture of HEVC with ALF and SAO.

Sample adaptive offset (SAO) was introduced for the next generation video coding standard called high efficiency video coding (HEVC). Sample adaptive offset is applied after deblocking filtering process, but before adaptive loop filtering (ALF) as shown in FIG. 1. In sample adaptive offset tool in HEVC and other extensions, picture, slice and LCU boundary pixels may not be filtered for different reasons such as to eliminate line buffer requirements, remove dependencies between slices etc. This leads to visual artifacts and quality/bit-rate degradation. This disclosure presents techniques for SAO processing of picture, slice, and LCU boundary pixels to mitigate visual artifacts and reduce quality/bit-rate degradation.

Figure 2:
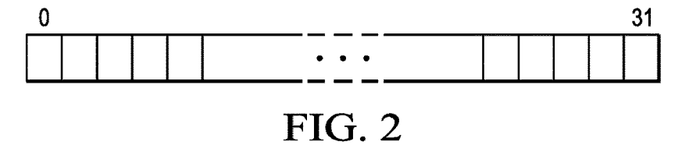
FIG. 2. is an embodiment depicting a band Offset (BO) group classification.
Figure 3A:
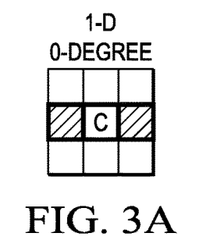
FIGS. 3A-D are embodiments depicting edge offset pixel classification patterns.
Figure 3B:
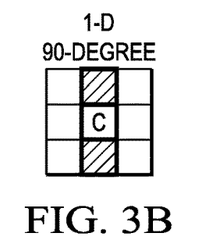
Figure 3C:
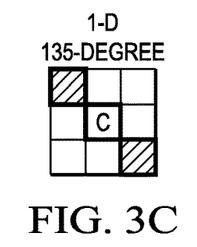
Figure 3D:
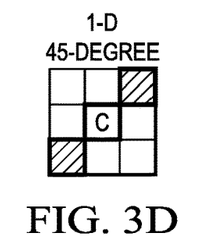

SAO involves adding an offset directly to the reconstructed pixel from the video decoder loop in FIG. 1. The offset value applied to each pixel depends on the local characteristics surrounding that pixel. There are two kinds of offsets, namely band offset (BO) and edge offset (EO). The band offset classifies pixels by intensity interval of the reconstructed pixel, while edge offset classifies pixels based on edge direction and structure. FIG. 2. is an embodiment depicting a band Offset (BO) group classification. For band offset, the pixel is classified into one of 32 band and 4 offsets are provided that corresponds to 4 consecutive bands, of which the starting band is signaled.

SUMMARY

Embodiments of the current invention relate to a method and apparatus for decoding video. The method includes determining a sample adaptive offset edge type of at least a portion of the image, determining a boundary edge type of the at least a portion of the image, modifying the sample adaptive offset edge type of the at least a portion of the image according to the determined boundary edge type of the at least a portion of the image, selecting a sample adaptive offset type according to at least one of the determined sample adaptive offset edge type or the modified sample adaptive offset edge type, and filtering at least a portion of the image utilizing the selected sample adaptive offset type.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS OF THE INVENTION

For EO, the pixels can be filtered in one of four directions shown in FIGS. 3A-D. For each direction, the pixel is classified into one of five categories based on the value of c, where c is the intensity value of the current reconstructed pixel. The category number can be calculated as sign(p0−p1)+sign (p0−p2), where p0 is current pixel and p1 and p2 are neighboring pixels. 1) c<2 neighboring pixels 2) c<1 neighbor && c==1 neighbor 3) c>1 neighbor && c==1 neighbor 4) c>2 neighbors 5) none of above (c=either neighbor)

There are two level of sample adaptive offset—picture level and largest coding unit (LCU) level. In case of LCU level sample adaptive offset processing, the sample adaptive offset parameters are estimated at the encoder side for each LCU. At the slice level, sample adaptive offset switch can be signaled.

sample_adaptive_offset_flag=enabling sample adaptive offset processing for slice In case of LCU level SAO, the encoder can signal the following to the decoder:

sao_type_idx=type of sample adaptive offset (table 1)
sao_offset=sample adaptive offset offset value

TABLE 1

Specification of NumSaoClass

| sao_type_idx | NumSaoCategory | SAO type |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 4 | Band offset |

Figure 4:
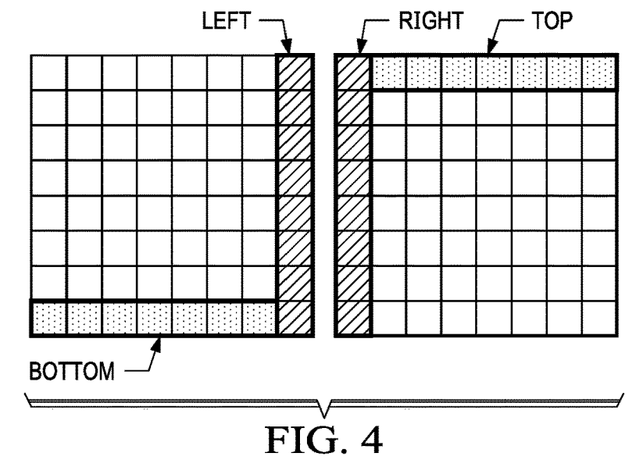
FIG. 4 is an embodiment depicting a modification of slice boundary processing.
Figure 5:
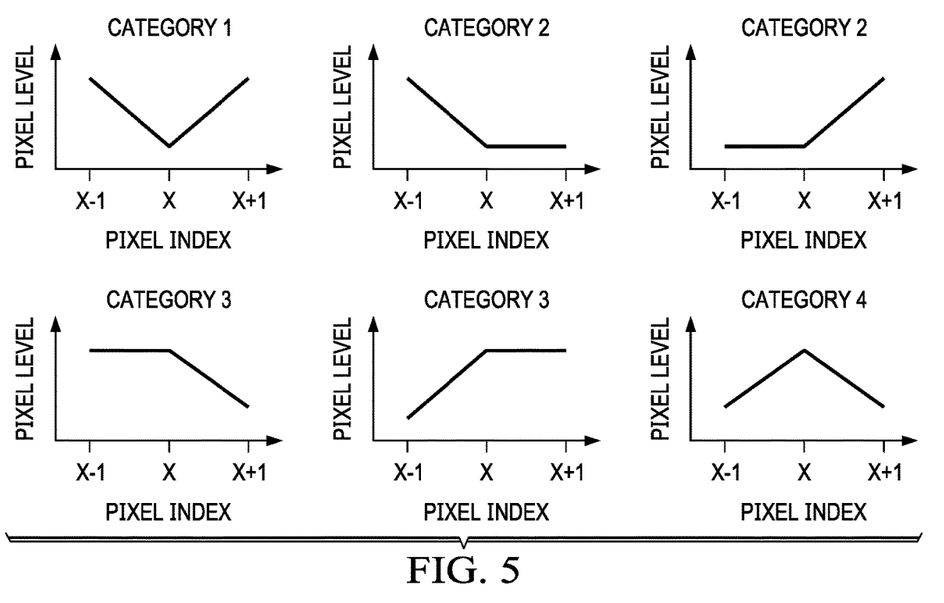
FIG. 5 is an embodiment depicting an illustration of edge offset categories.

For each region, a sao_type_idx is signaled followed by offset values for each category. FIG. 5 illustrates edge structure according to each category. As shown in FIG. 4, sample adaptive offset modification may be done across vertical slice boundary or horizontal slice boundary.

Currently, the sample adaptive offset parameters include sample adaptive offset type, starting band in case of BO, and offset values, and these are provided for each color component separately. The problem at the encoder side is that it requires the pixel values after deblock filtering process is finished to estimate sample adaptive offset parameters. However, this will delay the encoding process, since deblock filtering requires pixels belonged to neighboring LCU. Therefore, this prohibits LCU based processing. One solution to this is not using pixels which are not yet deblock processed. However, this will cause performance degradation of sample adaptive offset processing.

Figure 6:
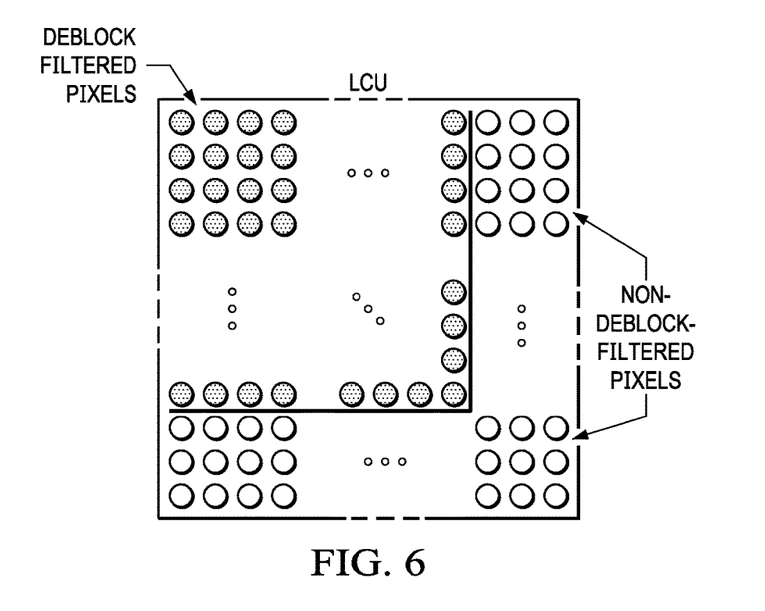
FIG. 6 is an embodiment depicting an illustration of pixels in LCU with deblock filter boundary.

FIG. 6 shows illustration of pixels in LCU, where solid line indicates the boundary between deblocked filtered pixels and non-deblock-filtered pixels. The non-deblock-filtered pixels require coded pixels in the neighboring LCUs, i.e., right LCU and bottom LCU to perform deblock filtering. Note that the number of rows and columns of non-deblock-filtered pixel depend on deblock filter design. This will be also different for each color component if different deblock filter tap length is applied for each color component. For example, it will be 3 for luma, and 1 for chroma according to the deblock filter design in HM-5.0, which is the HEVC reference software.

Figure 7:
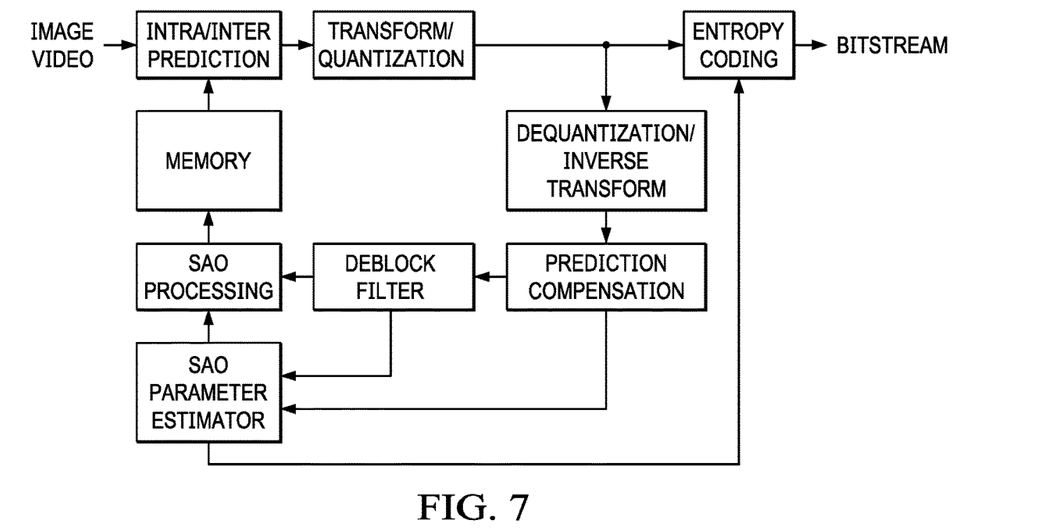
FIG. 7 is an embodiment depicting a block diagram of the proposed sample adaptive offset parameter estimator using non-deblock-filtered pixels.

In this invention, we propose to use non-deblock-filtered pixels to estimate sample adaptive offset parameters to enable LCU based processing at the same time to improve coding efficiency by sample adaptive offset processing. FIG. 7 shows a block diagram, where the sample adaptive offset parameter estimation is performed not only using deblock filtered pixels but also using non-deblock-filtered pixels, which is output of prediction compensation.

First embodiment is to use all the non-deblock-filtered pixels in the LCU for the sample adaptive offset parameter estimation. In this case, the sample adaptive offset parameter estimation processing can be performed independently from the deblock filtering process. The estimated parameters will be applied to the sample adaptive offset processing for the deblock filtered pixels.

Second embodiment is to use both deblock filtered pixels and non-deblock-filtered pixels together as shown in FIG. 6. By use of this scheme, sample adaptive offset parameter estimation can be performed without waiting until the end of deblock filtering process of the LCU. Since this scheme uses deblock filtered pixels available in the LCU, this will improve the accuracy of sample adaptive offset parameter estimation.

Third embodiment is to wait until the end of coding of the right LCU, and use the deblock filtered pixels using the coded pixels in the right LCU. In this case, the bottom pixel lines are still not deblock-filtered. For low-latency processing, the non-deblock-filtered pixels are used for the sample adaptive offset parameter estimation. FIG. 6 shows the illustration of this case. This scheme will cause delay until the coding of right LCU, but will provide better accuracy of sample adaptive offset parameter estimation than the second embodiment.

The area of deblock filtered pixels which can be used for sample adaptive offset parameter estimation can be adaptive to sample adaptive offset type. For example, when sample adaptive offset type 2, 3, or 4 is used, it requires looking at the pixels in the one line below of the current pixel to check edge shape. Therefore, 4 bottom lines are removed for sample adaptive offset parameter estimation, and can be replaced with non-deblock-filtered pixels. When sample adaptive offset type 1, 3, or 4 is used it requires looking at the pixels in the one line right to the current pixel to check edge shape. Therefore, 4 rightmost lines are removed for sample adaptive offset parameter estimation, and can be replaced with non-deblock-filtered pixels. When sample adaptive offset type 5 is used, which is BO, only 3 lines can be removed and replaced with non-deblock-filtered pixels for sample adaptive offset parameter estimation. Table 2 below shows the number of deblock-filtered pixel lines in each LCU to be avoided for sample adaptive offset parameter estimation, which can be replaced with non-deblock-filtered pixels, for each sample adaptive offset type, when HEVC deblock filter is used.

TABLE 2

Number of horizontal and vertical non-deblock-filtered pixel lines to be avoided for sample adaptive offset parameter estimation.

| | Luma | | Chroma | |
|---|---|---|---|---|
| sao_type_idx | horizontal line | vertical line | horizontal line | vertical line |
| 0 | N/A | N/A | N/A | N/A |
| 1 | 3 bottom lines | 4 rightmost lines | 1 bottom lines | 2 rightmost lines |
| 2 | 4 bottom lines | 3 rightmost lines | 2 bottom lines | 1 rightmost lines |
| 3 | 4 bottom lines | 4 rightmost lines | 2 bottom lines | 2 rightmost lines |
| 4 | 4 bottom lines | 4 rightmost lines | 2 bottom lines | 2 rightmost lines |
| 5 | 3 bottom lines | 3 rightmost lines | 1 bottom lines | 1 rightmost lines |

Figure 8:
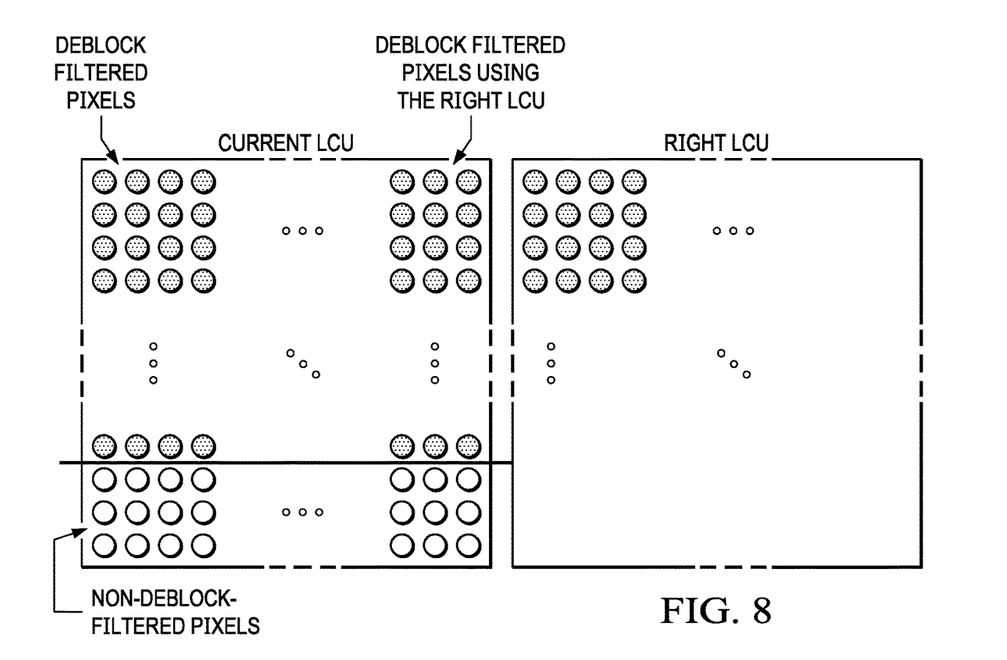
FIG. 8 is an embodiment depicting a illustration of pixels in LCU with deblock filter boundary.
Figure 9:
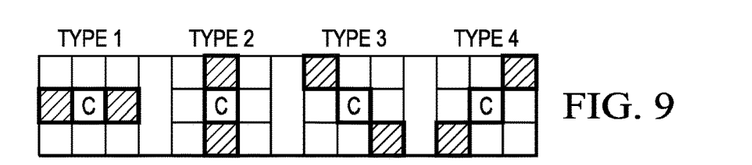
FIG. 9 is an embodiment depicting edge sample adaptive offset types.
Figure 10:
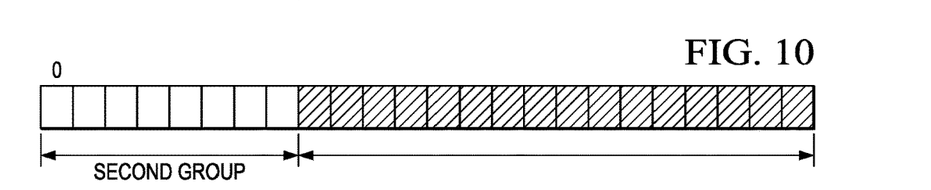
FIG. 10 is an embodiment depicting band sample adaptive offset types.

As shown in FIG. 8 and FIG. 9, for a given region (leaf sample adaptive offset unit), determine the type of sample adaptive offset to use. There are six types of SAO: four types of edge offsets, one type of band offsets, and turning SAO off. As shown in the table 3, for leaf sample adaptive offset unit, signal set of offsets 4 offsets for edge sample adaptive offset for categories 1 to 4, or 4 offsets for band SAO for four consecutive bands.

TABLE 3

| Category | Condition |
| --- | --- |
| 1 | c < 2 neighboring pixels |
| 2 | c < 1 neighbor && c == 1 neighbor |
| 3 | c > 1 neighbor && c == 1 neighbor |
| 4 | c > 2 neighbors |
| 0 | None of the above |

Figure 11:
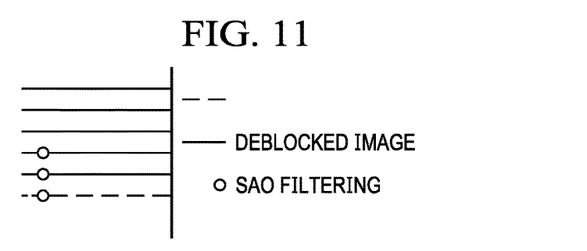
FIG. 11 is an embodiment depicting utilizing deblocked pixels of sample adaptive offset filtering.
Figure 12:
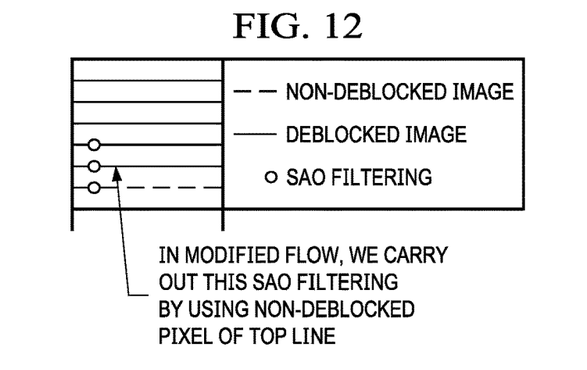
FIG. 12 is an embodiment depicting utilizing non-deblocked pixels of sample adaptive offset filtering.

FIG. 11 is an embodiment depicting utilizing deblocked pixels of sample adaptive offset filtering. FIG. 12 is an embodiment depicting utilizing non-deblocked pixels of sample adaptive offset filtering. For LCU based deblock filtering, a line buffer of 2 lines is required at LCU boundary since pixels from bottom LCU are not available. As shown in FIG. 12, for LCU based deblock filtering, a line buffer of 2 lines is required at LCU boundary since pixels from bottom LCU are not available, sample adaptive offset operates on deblocked image can span three lines as shown in FIG. 12, sample adaptive offset required one additional line buffer if the constraint that sample adaptive offset operate on deblocked image is imposed, left of FIG. 12, in such a flow, sample adaptive offset operates on non-deblocked image pixel as shown in figure on right—so no additional sample adaptive offset line buffer is required. As such, sample adaptive offset filtering of the dotted lines can be carried out, since bottom line has not been deblocked yet, left portion of FIG. 12. As shown on the right side of FIG. 12, with the modified flow, the sample adaptive offset filtering can be carried out by using non deblocked pixel of bottom line.

Figure 13A:
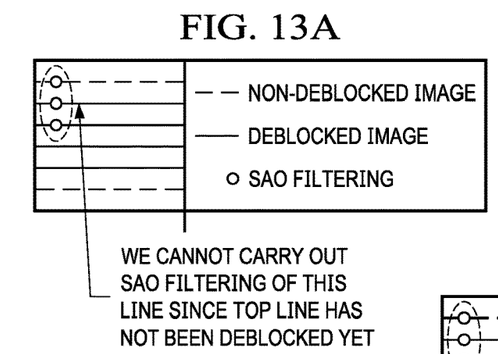
FIG. 13A and FIG. 13B is another embodiment depicting utilizing deblocked v. non-deblocked pixels of sample adaptive offset filtering.
Figure 13B:
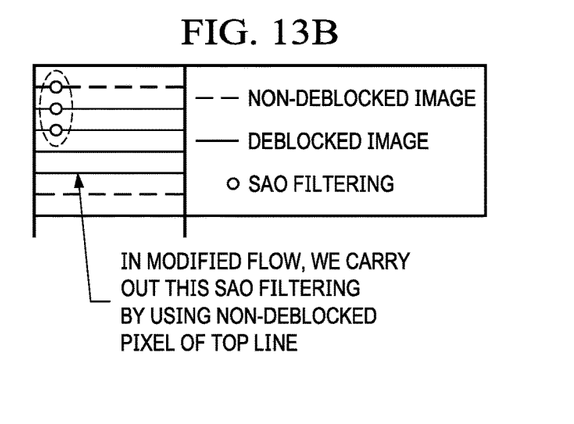

FIG. 13 is yet another embodiment depicting utilizing deblocked pixels of sample adaptive offset filtering. In the left portion of FIG. 13, since the top line has not been deblocked, sample adaptive offset filter is not carried out. However, in the right portion of FIG. 13, sample adaptive offset filtering is carried out using the non-deblocked pixels of the top line.

Figure 14:
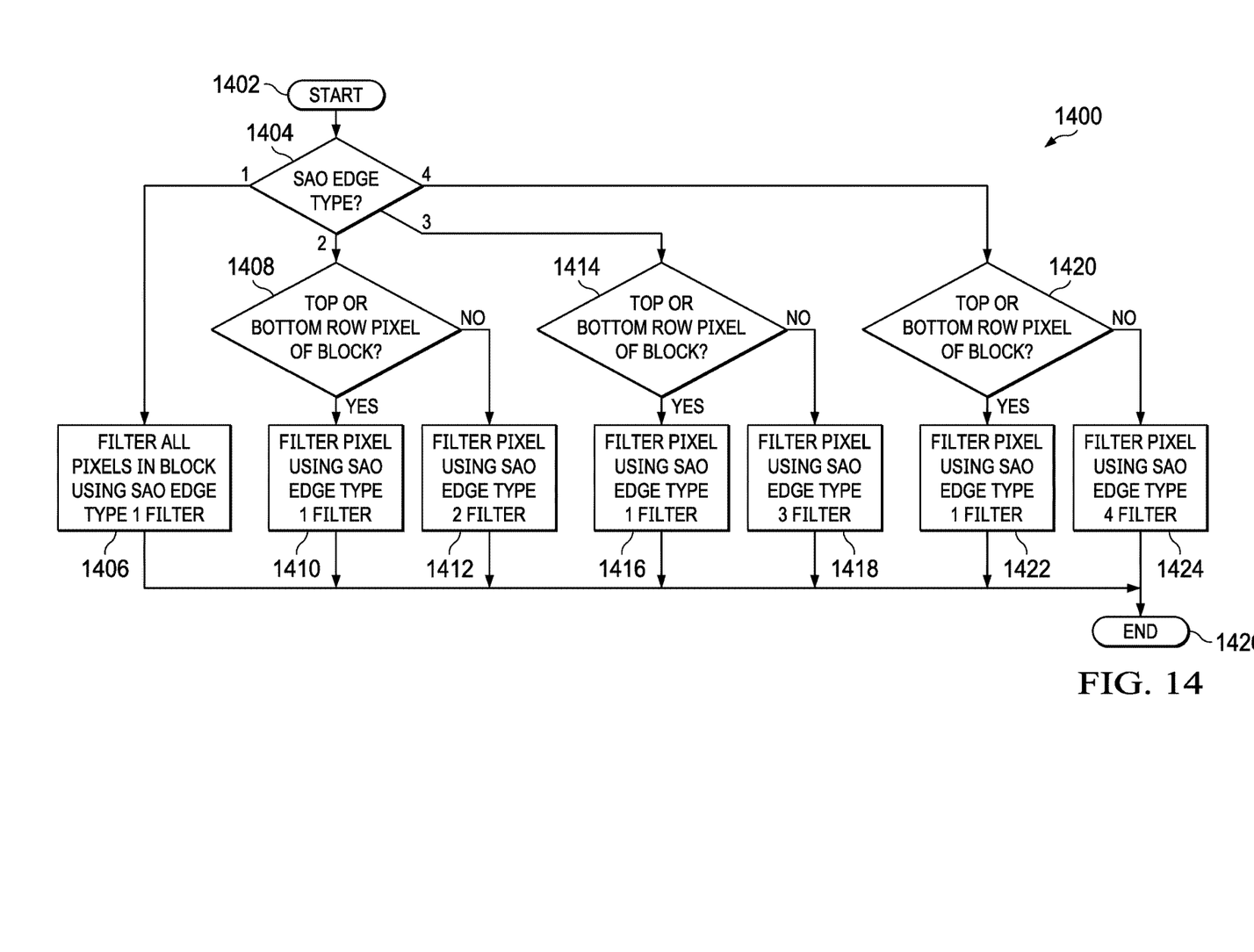
FIGS. 14, 15, and 16 are various embodiments of method for performing sample adaptive offset filtering
Figure 15:
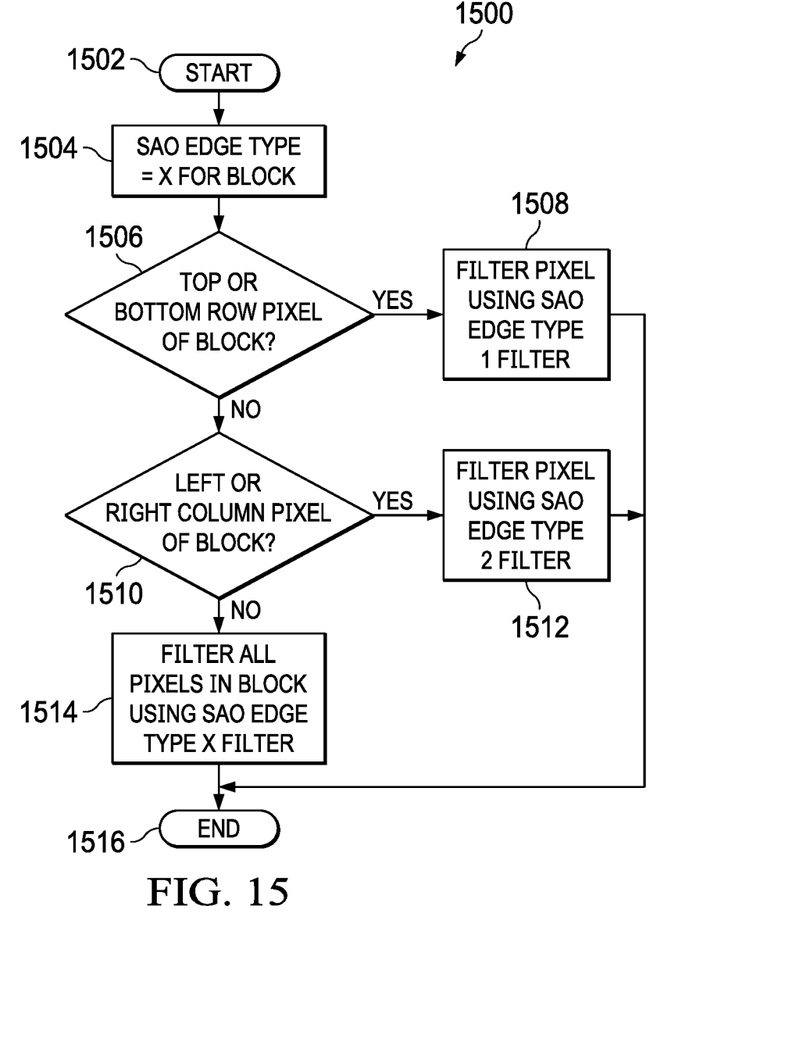
Figure 16:
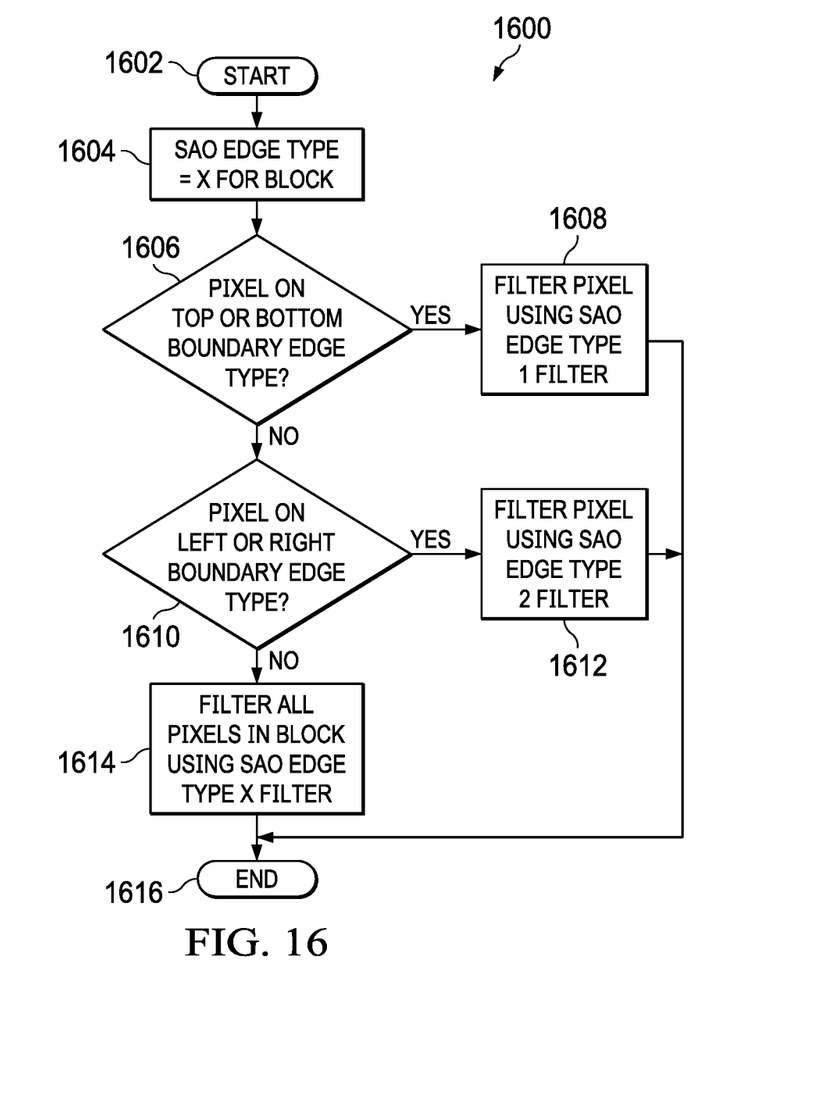

FIGS. 14, 15, and 16 are various embodiments of method for performing sample adaptive offset filtering. In FIG. 14, a method 1400 starts at step 1402 and proceeds to step 1404. In step 1404, the method 1400 determines the sample adaptive offset type. If it is type 1, the method proceeds to step 1406, wherein the all the pixels I the block are filtered using sample adaptive offset edge type 1 filter. If the type s type 2, the method proceeds to step 1408, wherein the method 1400 determines if row pixels are top or bottom row pixels. If they are top or bottom row pixels, the method 1400 proceeds to step 1410, wherein the method 1400 filters pixels using sample adaptive offset edge type 1 filter; otherwise, the method 1400 proceeds from step 1408 to step 1412. At step 1412, the method 1400 filters pixels using sample adaptive offset edge type 2 filter.

If the type is type 3, the method 1400 proceeds from step 1404 to step 1414, wherein the method 1400 determines if row pixels are top or bottom row pixels. If they are top or bottom row pixels, the method 1400 proceeds to step 1416, wherein the method 1400 filters pixels using sample adaptive offset edge type 1 filter; otherwise, the method 1400 proceeds from step 1414 to step 1418. At step 1418, the method 1400 filters pixels using sample adaptive offset edge type 3 filter.

If the type is type 4, the method 1400 proceeds from step 1404 to step 1420, wherein the method 1400 determines if row pixels are top or bottom row pixels. If they are top or bottom row pixels, the method 1400 proceeds to step 1422, wherein the method 1400 filters pixels using sample adaptive offset edge type 1 filter; otherwise, the method 1400 proceeds from step 1420 to step 1424. At step 1424, the method 1400 filters pixels using sample adaptive offset edge type 4 filter. From steps 1406, 1410, 1412, 1416, 1418, 1422 and 1424, the method 1400 proceeds to step 1426. At step 1426, the method 1400 ends.

The method 1500 of FIG. 15 starts at step 1502 and proceeds to step 1504. At step 1504, the method 1500 determines the sample adaptive offset edge type, which is set to be type X in this embodiment. At step 1506, the method 1500 determines if row pixels of the block are top or bottom row pixels.

If they are top or bottom row pixels, the method 1500 proceeds to step 1508, wherein the method 1500 filters pixels using sample adaptive offset edge type 1 filter; otherwise, the method 1500 proceeds from step 1506 to step 1510, wherein the method 1500 determines if the column pixels are left or right column pixels. If they are left or right column pixels, the method 1500 proceeds to step 1512, wherein the method 1500 filters pixels using sample adaptive offset edge type 2 filter; otherwise, the method 1500 proceeds from step 1510 to step 1514. At step 1514, the method 1500 filters the pixels using sample adaptive offset edge type X filter. From steps 1508, 1512, and 1514, the method 1500 proceeds to step 1516. At step 1516, the method 1500 ends.

The method 1600 of FIG. 16 starts at step 1602 and proceeds to step 1604. At step 1604, the method 1600 determines the sample adaptive offset edge type, which is set to be type X in this embodiment. At step 1606, the method 1600 determines if the pixels of the block are top or bottom boundary edge type. If they are top or bottom row pixels, the method 1600 proceeds to step 1608, wherein the method 1600 filters pixels using sample adaptive offset edge type 1 filter; otherwise, the method 1600 proceeds from step 1606 to step 1610, wherein the method 1600 determines if the pixels are left or right boundary edge type. If they are left or right boundary edge type, the method 1600 proceeds to step 1612, wherein the method 1600 filters pixels using sample adaptive offset edge type 2 filter; otherwise, the method 1600 proceeds from step 1610 to step 1614. At step 1614, the method 1600 filters the pixels using sample adaptive offset edge type X filter. From steps 1608, 1612, and 1614, the method 1600 proceeds to step 1616. At step 1616, the method 1600 ends.

Figure 17:
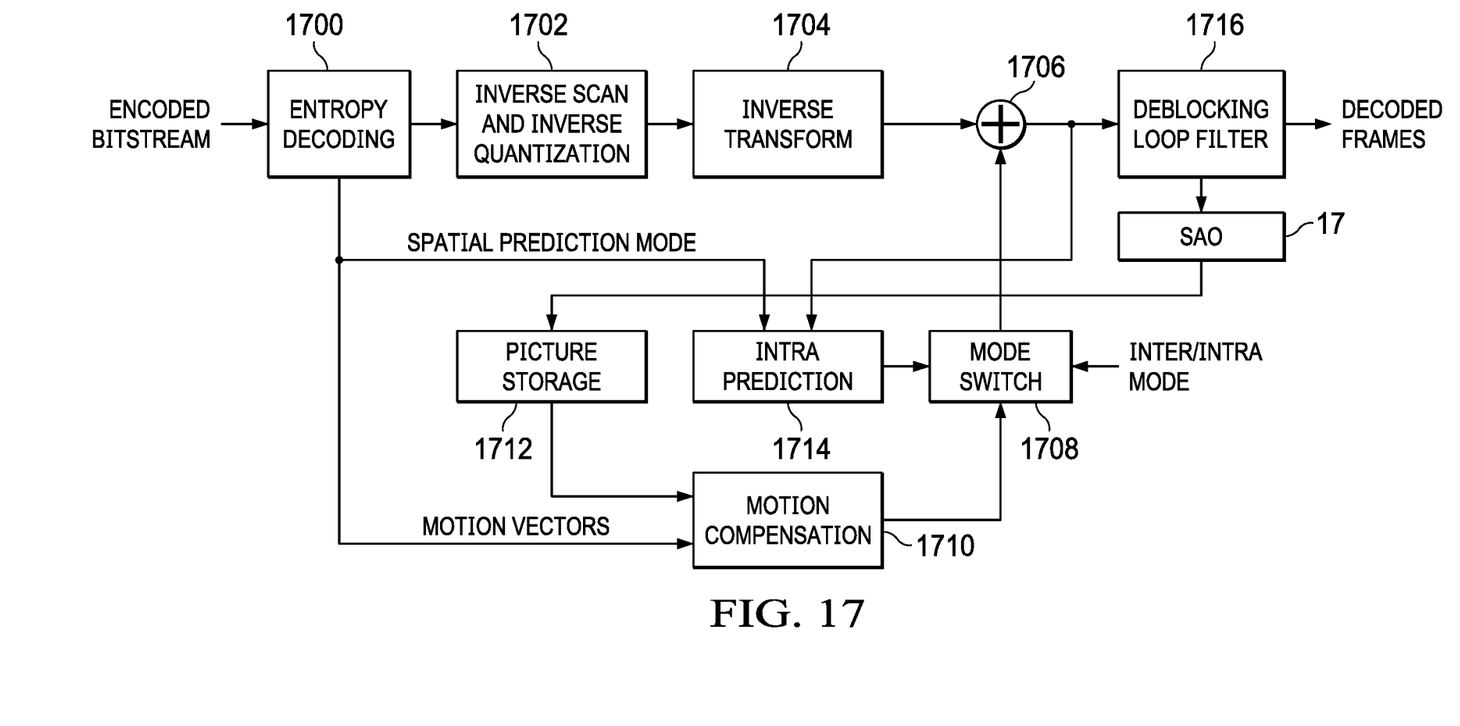
FIG. 17 shows a block diagram of an example video decoder.

FIG. 17 shows a block diagram of an example video decoder. The video decoder operates to reverse the encoding operations, i.e., entropy coding, quantization, transformation, and prediction, performed by a video encoder to regenerate the pictures of the original video sequence. In view of the above description of a video encoder, one of ordinary skill in the art will understand the functionality of components of the video decoder without detailed explanation.

The entropy decoding component 1700 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 1700 then reconstructs the motion vector(s) as needed and provides the motion vector(s) to the motion compensation component 1710.

The inverse scan and inverse quantization component 1702 receives entropy decoded quantized transform coefficients from the entropy decoding component 1700, inverse scans the coefficients to return the coefficients to their original post-transform arrangement, i.e., performs the inverse of the scan performed by the scan component of the encoder to reconstruct quantized transform blocks, and de-quantizes the quantized transform coefficients. The forward scanning in the encoder is a conversion of the two dimensional (2D) quantized transform block to a one dimensional (1D) sequence; the inverse scanning performed here is a conversion of the 1D sequence to the two dimensional quantized transform block using the same scanning pattern as that used in the encoder.

The inverse transform component 1704 transforms the frequency domain data from the inverse scan and inverse quantization component 1702 back to the residual CU. That is, the inverse transform component 1704 applies an inverse unit transform, i.e., the inverse of the unit transform used for encoding, to the de-quantized residual coefficients to produce the residual CUs. The inverse transform component 1704 may perform techniques for IDCT pruning as described herein.

A residual CU supplies one input of the addition component 1706. The other input of the addition component 1706 comes from the mode switch 1708. When an inter-prediction mode is signaled in the encoded video stream, the mode switch 1708 selects predicted PUs from the motion compensation component 1710 and when an intra-prediction mode is signaled, the mode switch selects predicted PUs from the intra-prediction component 1714.

The motion compensation component 1710 receives reference data from storage 1712 and applies the motion compensation computed by the encoder and transmitted in the encoded video bit stream to the reference data to generate a predicted PU. That is, the motion compensation component 1710 uses the motion vector(s) from the entropy decoder 1700 and the reference data to generate a predicted PU.

The intra-prediction component 1714 receives the output of the addition component 1706. The intra-prediction component 1714 applies the intra-prediction computed by the encoder as signaled by the intra-prediction mode transmitted in the encoded video bit stream to the reference data to generate a predicted PU.

The addition component 1706 generates a decoded CU by adding the predicted PUs selected by the mode switch 1708 and the residual CU. The output of the addition component 1706 supplies the input of the in-loop filter component 1716. The in-loop filter component 1716 performs the same filtering as the encoder. The output of the in-loop filter component 1716 is the decoded pictures of the video bit stream and is the input of the SAO 1717. Further, the output of the SAO 1717 is the SAO filter type, which is stored in storage 1712 to be used as reference data.

Figure 18:
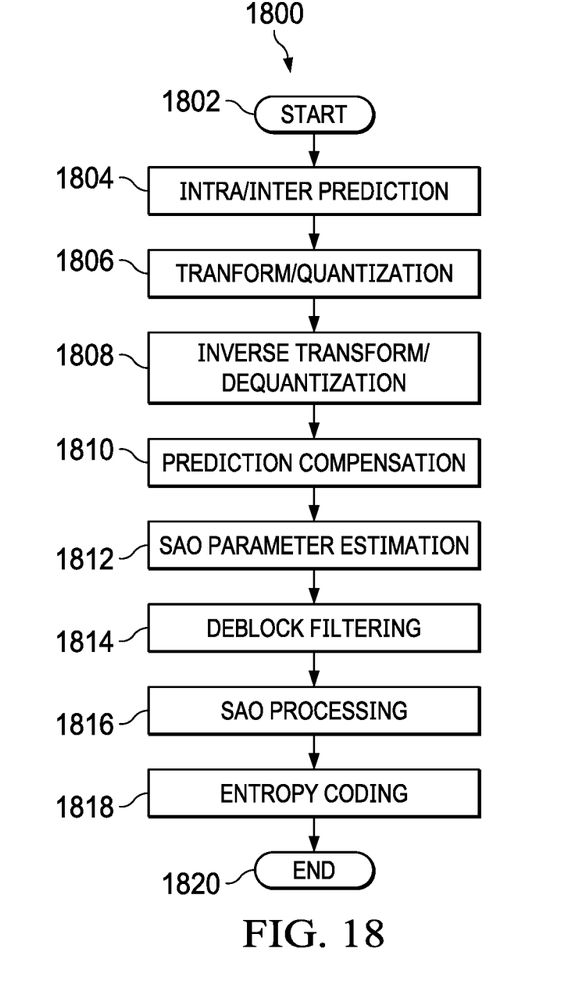
FIGS. 18 and 19 are embodiments of a method for an encoder utilizing sample adaptive offset parameter estimation for image and video coding
Figure 19:
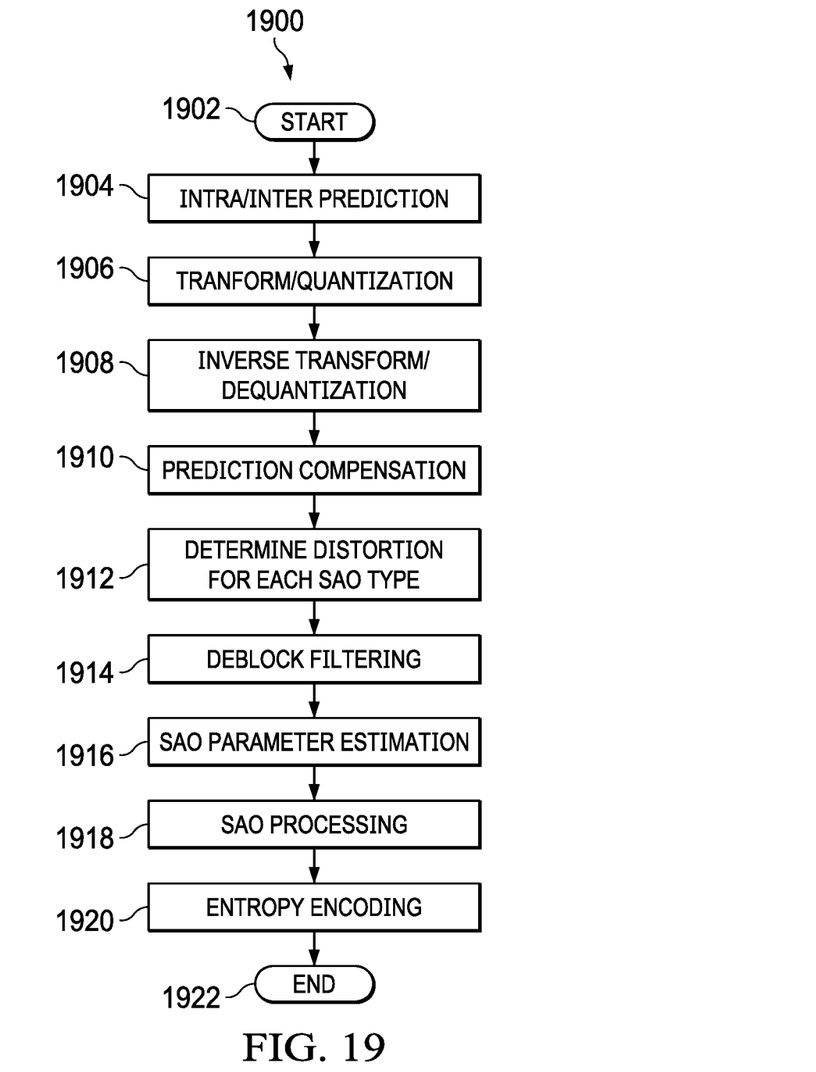

FIGS. 18 and 19 are embodiments of a method 1800 for an encoder utilizing sample adaptive offset parameter estimation for image and video coding. The method 1800 is usually performed for each LCU. The method 1800 starts at step 1802 and proceeds to step 1804. At step 1804, the method 1800 performs inter/intra prediction. At step 1806, the method 1800 performs quantization and calculates the related transform. At step 1808, the method 1800 performs inverse transform/quantization. At step 1810, the method 1800 performs prediction compensation. At step 1812, the method 1800 performs SAO parameter estimation. At step 1814, the method 1800 performs deblock filtering. At step 1816, the method 1800 performs SAO processing. At step 1818, the method 1800 performs entropy coding. The method 1800 ends at step 1820.

The method 1900 is usually performed for each LCU. The method 1900 starts at step 1902 and proceeds to step 1904. At step 1904, the method 1900 performs inter/intra prediction. At step 1906, the method 1900 performs quantization and calculates the related transform. At step 1908, the method 1900 performs inverse transform/quantization. At step 1910, the method 1900 performs prediction compensation. At step 1912, the method 1900 determines distortion for each SAO type. At step 1914, the method 1900 performs deblock filtering. At step 1916, the method 1900 performs SAO parameter estimation. At step 1918, the method 1900 performs SAO processing. At step 1920, the method 1900 performs entropy coding. The method 1900 ends at step 1922.

While the foregoing is directed to embodiments of the present invention, other and further embodiments of the invention may be devised without departing from the basic scope thereof, and the scope thereof is determined by the claims that follow.

What is claimed is:

1. A video decoding method, comprising:
    determining a first sample adaptive offset (SAO) parameter for a first pixel using a first type of SAO filter when the first pixel is bordering a horizontal boundary of a largest coding unit (LCU), wherein the determining of the first SAO parameter is based on deblock filtered pixels and non-deblock filtered pixels;
    determining a second SAO parameter for a second pixel using a second type of SAO filter when the second pixel is bordering a vertical boundary of the LCU, wherein the determining of the second SAO parameter is based on the deblock filtered pixels and the non-deblock filtered pixels;
    filtering the first pixel using the determined first SAO parameter; and
    filtering the second pixel using the determined second SAO parameter.

2. A video decoder comprising a non-transitory computer readable medium including instructions that, when executed, cause the video decoder to:
    determine a first sample adaptive offset (SAO) parameter for a first pixel using a first type of SAO filter when the first pixel is bordering a horizontal boundary of a largest coding unit (LCU), wherein the first SAO parameter is based on deblock filtered pixels and non-deblock filtered pixels;
    determine a second SAO parameter for a second pixel using a second type of SAO filter when the second pixel is bordering a vertical boundary of the LCU, wherein the second SAO parameter is based on the deblock filtered pixels and the non-deblock filtered pixels;
    filter the first pixel using the determined first SAO parameter; and
    filter the second pixel using the determined second SAO parameter.

3. A non-transitory computer readable medium comprising instructions that, when executed, cause a video decoder to:
    determine a first sample adaptive offset (SAO) parameter using a first type of SAO filter when the first pixel is bordering a horizontal boundary of a largest coding unit (LCU), wherein the first SAO parameter is based on deblock filtered pixels and non-deblock filtered pixels;
    determine a second SAO parameter for a second pixel using a second type of SAO filter when the second pixel is bordering a vertical boundary of the LCU, wherein the second SAO parameter is based on the deblock filtered pixels and the non-deblock filtered pixels;

filter the first pixel using the determined first SAO parameter; and filter the second pixel using the determined second SAO parameter.

* * * * *